United States Patent Office 2,732,477
Patented Jan. 24, 1956

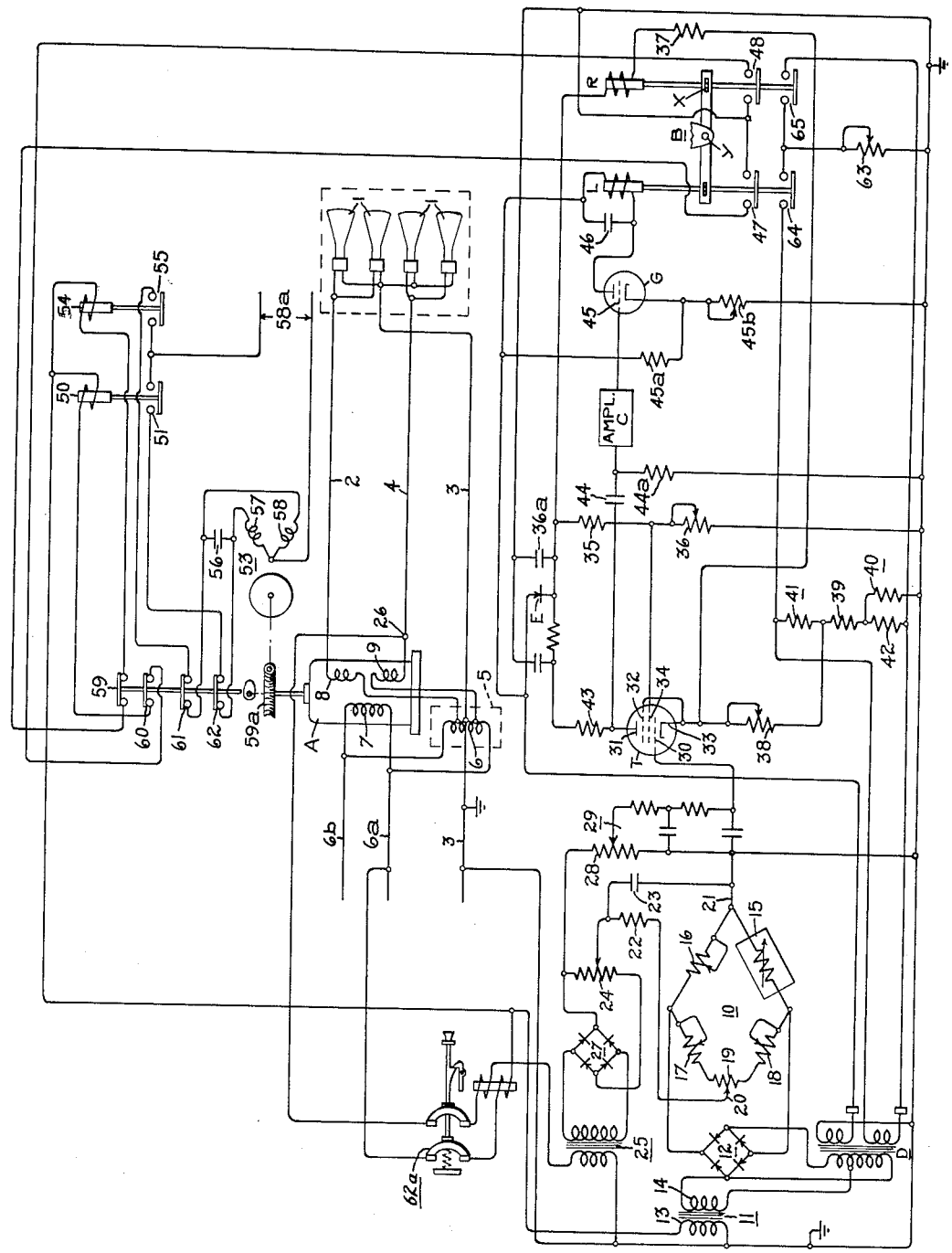
Inventors:
Lewis R. Runaldue,
Morris T. Reese,
by Gilbert P. Tarleton
Their Attorney.

2,732,477

CONTROL SYSTEM

Lewis R. Runaldue, Dalton, and Morris T. Reese, Pittsfield, Mass., assignors to General Electric Company, a corporation of New York Application December 5, 1952, Serial No. 324,229

9 Claims. (Cl. 219—20)

This invention relates to control systems and, more particularly, to control systems in which a variable condition is converted into an electrical expression, and the resulting electrical expression is used to control another variable.

Although this invention is not limited to such use, it is particularly applicable to installations in which radiant energy devices, such as infra-red lamps, are used to supply radiant heat energy to poultry, such as in a chicken brooder. Since the amount of radiant energy required by the chicks depends upon the ambient temperature, the radiant energy output of the lamps is varied in accordance with changes in ambient temperature. Since the energy output of the lamps is a function of the voltage applied to the lamps, this applied voltage must be varied in accordance with changes in ambient temperature.

In the past, there has been built a temperature-sensitive chicken brooder control system comparable in nature to the present invention and disclosed in application Serial No. 247,958, filed September 24, 1951 which issued as United States Letters Patent No. 2,651,704 on September 8, 1953, and assigned to the assignee of the present invention. That control system employed a self-compensating servo-loop which was used to measure the ambient temperature. This servo-loop had a mechanical output which was used to control a voltage regulating relay, which in turn controlled the voltage output of a voltage regulator supplying infra-red lamps, thus varying the radiant energy emitted by the lamps in accordance with changes in ambient temperature. First, the servo-loop was expensive to build and employed bulky components which were subject to wear and misalignment. Second, the servo-loop had a mechanical output which was not useful until converted into electrical energy.

Accordingly, it is an object of this invention to provide a new and improved control system.

Additionally, it is an object of this invention to eliminate the servo-loop employed in previous devices and to accomplish all of the functions of said servo-loop without the associated disadvantages.

Another object of this invention is to provide a control system which adjusts the output of a voltage regulator to a value which is a function of the ambient temperature and then maintains this output voltage at the required value in spite of the usual variations in the input voltage to the regulator.

Still another object of our invention is to provide a new and improved control system for a heater element, which control system employs amplifier means and operates in case of failure of said amplifier means to adjust said heater element to an extreme output condition.

The objects of our invention may be realized through the provision of a control system for a motor-operated voltage regulator, which system comprises three major components (1) a voltage reference circuit which by utilizing a temperature-sensitive element provides a unidirectional voltage which is a function of the ambient temperature, (2) an indicator circuit which provides a unidirectional voltage related to the voltage output of the regulator, and (3) amplification means which utilizes the algebraic sum of above unidirectional voltages to operate a relay which controls the adjusting motor of the voltage regulator, thereby varying the voltage output of the regulator in accordance with ambient temperature changes.

The invention will be better understood by considering the following description taken in connection with the accompanying drawing and its scope will be pointed out in the appended claims.

In the drawing is shown a circuit diagram for a control system embodying the present invention.

Referring now to the drawing, there is shown a plurality of electrical heating devices 1, such as infra-red lamps connected between power lines 2, 3, and 4 of a single phase three wire power supply. Any one lamp is connected only between two of the lines, such as between lines 2 and 3, or between lines 3 and 4. Line 3 is a grounded neutral line. Lines 2, 3, and 4 are appropriately connected to an auto transformer 5 having a winding 6 supplied from a voltage source through leads 6a and 6b.

It will be understood, of course, that other means for applying electrical power to the load devices may be used and that we have described and shown only one of several different connections which might be used. For example, a conventional transformer having separate primary and secondary windings equally well could be used.

In order to maintain the voltage applied through lines 2, 3, 4 to the load devices 1 at a predetermined value, a voltage regulator indicated generally at A is provided. This voltage regulator A comprises a shunt winding 7 which is connected in parallel relationship with the winding 6 of the auto transformer. Additionally, the voltage regulator has series windings 8 and 9, these windings being respectively connected in power lines 2 and 4 leading to the lamps. The windings 8 and 9 are in inductive relationship with regulator shunt winding 7, and the voltage induced in windings 8 and 9 may be varied by moving windings 8 and 9 relative to the shunt winding 7 by means of an operating motor 53 for the voltage regulator, as will be explained more fully hereinafter.

As has been explained hereinbefore, the radiant heat energy devices or other heating devices are placed in a location such as a poultry brooder, and this invention provides a system for regulating the heat energy output of the load 1 in accordance with variations in ambient temperature, as will now be described.

In order to detect and to express electrically the variations of ambient temperature which require a compensation in the radiant heat energy output of load 1, a voltage reference circuit containing a resistance network shown generally at 10 is provided. The resistance network is energized by a unidirectional voltage supplied from a constant voltage transformer 11 through conventional full wave bridge rectifier 12. The primary winding 13 of the transformer 11 is connected across power line 6a and grounded neutral line 3, and the secondary is connected to the bridge rectifier 12. The resistance network comprises resistance elements 15, 16, 17, 18, and 19. One terminal of the bridge rectifier is connected between resistances 16 and 17 of the resistance network and the other terminal is connected between resistances 18 and 15. The adjustable resistance 19 is connected between resistances 17 and 18 so that a portion is in that arm of the resistance network containing resistance 17 and a portion is in that arm containing resistance 18. The resistance 15, the value of which varies inversely and very rapidly with temperature, is exposed to the ambient temperature but is not exposed to the radiant energy being supplied. All of the resistances of the bridge except resistance 15 have a low temperature coefficient of resistance and are affected by changes in temperature to only a negligible extent. For a given position of pointer 20, a unidirectional voltage, the magnitude of which depends upon the existing ambient temperature, is developed between the pointer 20 and the ground connection 21. This unidirectional voltage is filtered by resistance 22 and capacitance 23, and the resulting voltage may be termed the output voltage of the reference circuit. Thus, it may be seen that by properly calibrating and adjusting the components of the resistance network, there is developed across capacitance 23 a unidirectional voltage which is a function of the ambient temperature.

The voltage developed across the capacitance 23 is added in series opposition to a portion of the voltage across resistance 24, this voltage across resistance 24 being a function of the average voltage output of the regulator A. This relationship between the regulator output voltage and the voltage across resistance 24 is obtained by an indicator circuit comprising an isolating transformer 25 having its primary connected between power line 4 at 26 and the grounded neutral 3. The secondary winding of transformer 25 is connected across a full wave bridge rectifier 27, the terminals of which are connected across resistance 24. Thus it may be seen that a unidirectional voltage which is proportional to the average output voltage of the regulator A is produced across resistance 24.

Adding the voltage across capacitance 23 in series opposition to the voltage across resistance 24 will result in a large percentage of the difference between these two voltages being expressed as a voltage across variable resistance 28. This unidirectional voltage across resistance 28 will be positive if the regulator output is too high, zero if the regulator output is correct, and negative if the regulator output is too low. A portion of this unidirectional voltage is filtered of any remaining alternating voltage by the resistance-capacitor network 29 and is applied to the control grid 30 of an amplifier tube T. This voltage applied to the control grid 30 might be termed the "error signal." The value of this error signal is an indication of that change in voltage output from the regulator A which is necessary for a given ambient temperature. The filtering network 29 also serves to protect the tube by limiting its plate current on large positive error signals.

The amplifier tube T comprises, in addition to control grid 30, a plate 31, a suppressor grid 32 connected to the cathode 33 and a screen grid 34, which is at a relatively low potential with respect to the plate, this potential being determined by resistances 35 and 36. The tube is biased by a fixed bleeder circuit comprising one of the secondary windings of a transformer D, rectifier E which has the usual filter capacitor 36a connected thereto, the "raise" coil R of the motor control relay generally indicated at B, and resistances 37, 38, 39, and 40. This bias is of such a value that the gain of the tube T will be varied a large amount when an error signal is applied to the control grid 30. This bias may be adjusted by varying resistance 38. An isolated 60 cycle alternating voltage from transformer D is applied to resistances 41, 39, 42, and that portion existing across resistance 39 is effectively applied from control grid to cathode of the tube T. The output of tube T, developed across resistance 43 is coupled to a second amplifier C, which may comprise a conventional triode. The coupling may be a conventional resistance-capacitance coupling comprising the capacitance 44 and resistance 44a. The output of amplifier C is applied to the control grid 45 of an additional amplifier G, which is coupled to amplifier C in a conventional manner. This amplifier G is connected across one of the secondary windings of transformer D, is biased by resistances 45a and 45b, and has as its plate load the "lower" coil L of the motor control relay B. Capacitance 46, which is connected in parallel with respect to "lower" coil L, smooths out the current through this coil so as to prevent relay chatter. The secondary windings of transformer D have polarities such that the voltage applied to grid 45 of tube G is in phase with the voltage applied to the plate of tube G.

The relay B has a pivoted armature element X and two coils L and R which are disposed on opposite sides of the pivot y and are adapted to oppose each other so that when the output voltage of the regulator A is correct, the relay is in a balanced condition and the contacts 47 and 48 of the relay are open. As explained above, the "lower" coil is supplied from the amplifier G and the "raise" coil is supplied with a constant direct current. The "raise" contacts 48 close when the current through the amplifier G falls to a predetermined value, and the "lower" contacts 47 close when the current through amplifier G rises above a predetermined value. The desired balanced condition of the relay may be obtained by adjusting resistance 36 in the screen supply circuit of tube T when there is no voltage on the grid, thereby varying the gain of tube T until the currents in the two coils R and L of the relay B are balanced and the contacts 47 and 48 of the relay are open.

If the "raise" contacts of the relay B are closed a circuit through the coil of relay 50 is completed, thus energizing this coil and closing the normally open contacts 51. When the contacts 51 are closed, the conventional reversible capacitor-run motor 53 is operated in a direction to raise the voltage output of the regulator A. Similarly, if the "lower" contacts of relay B, instead of the "raise" contacts, are closed, a circuit is completed through the coil of relay 54, thereby energizing this coil and closing the normally open contacts 55. When contacts 55 are closed the motor is operated in an opposite direction from that previously pointed out, or as stated otherwise, in a direction to lower the voltage output of regulator A.

The capacitor run motor 53 referred to above has the usual capacitor 56 connected across its windings 57 and 58, which are supplied from an alternating voltage source 58a. Depending upon which of the contacts 51 or 55 are closed, the motor will operate through gearing 59a to either raise or lower the voltage output of the regulator A. Suitable limit switches 59, 60, 61, and 62 are connected in the motor power circuit and in the circuits of relays 50 and 54, so as to prevent excessive adjustment of the regulator parts in either direction. These switches are adapted to cooperate in a conventional manner with the adjusting mechanism of the voltage regulator A.

The components of the control system are protected from excessive overloads by the conventional circuit breaker 62a.

This invention also provides a means for compensating for the inertia effect of the voltage regulator and its associated parts, so as to prevent hunting of the system and so as to provide rapid and accurate adjustment of the regulator without overshooting. This desirable result is accomplished as follows: A resistance 63 is connected in circuit with resistances 41, 39, and 40 in such a manner that when the "lower" coil L of the relay B is predominant, the normally open contacts 64 are closed, and the resistance 63 is in parallel relationship with the series combination of resistances 41, 39, and 40. Similarly, when the coil R of relay B predominates, normally open contacts 65 are closed, and the resistance 63 is connected in parallel with the series combination of resistances 42 and 40. Thus, it may be seen that the alternating voltage at the cathode 33 of tube T is slightly decreased when the contacts 64 are closed and the motor 53 is operating to lower the voltage output of the regulator. Conversely, this alternating voltage at the cathode 33 is slightly increased when the contacts 64 are closed and the motor is operating to raise the voltage output of the regulator. By the above variation of the alternating voltage applied to the cathode 33 at the time the motor begins operation, the error signal required for actuation of the relay B is slightly different from that signal required for inactivating the relay. As a result of the above, the motor becomes deenergized, in point of time, slightly before the voltage regulator A is adjusted to the precise voltage desired, thus minimizing the inertia produced overshooting effects of the voltage regulator. By adjusting resistance 63, this compensating effect may be varied.

It should also be noted that the "band width," which may be defined as the sum of the voltage outputs from the reference circuit and the indicator circuit which is required to initiate raise or lower operations of the motor, may be controlled by adjustments of resistance 28.

The operation of the control system may be summarized as follows: If the output voltage of the regulator A is above that required for a given ambient temperature, then the voltage output from the reference circuit when added in series opposition at 24 to the voltage output from indicator circuit, produces a positive undirectional error signal on the control grid 30 of tube T. The gain of this tube is thereby increased, thus causing a larger current output from amplifier G to be applied to the "lower" coil L of the relay B, which, in turn, causes coil L to predominate, thereby closing the contacts 47, which operation causes the motor 53 to be energized for motion in such a direction that the output voltage of the regulator A is lowered to a point at which the error signal on grid 30 becomes zero. Simultaneously with the closing of contacts 47, the contacts 64 of the inertia-compensating portion of the system were closed, thus insuring that the voltage regulator A would be rapidly adjusted to the desired output wtih a minimum of hunting.

If the output of the voltage regulator A is below that required for a given ambient temperature, the unidirectional error signal applied to grid 30 becomes negative, thereby decreasing the gain of tube T, thus decreasing the current output of amplifier G. This decreased output permits the coil R of relay B to predominate, thereby causing contacts 48 and 65 to be simultaneously closed, thus resulting in inertia-compensated motor operation in such a direction that the voltage output of the regulator A is increased to a point at which the error signal on the control grid 30 becomes zero.

An additional feature of this invention is that when the device is used as a chicken brooder control, a convenient means is provided for making an "age adjustment" for changing the amount of heat supplied for a given ambient temperature. This adjustment is desirable since the chicks require less heat as they grow older. The age adjustment is obtained by changing the setting of pointer 20 of the variable resistance 19 in the resistance network 10, thus changing the voltage output of the reference circuit by a constant value at all ambient temperatures, thereby varying the voltage output of the regulator A for all ambient temperatures.

Still another feature of this invention is that accurate comparison of the voltage outputs of the indicator and the reference circuits is obtained by using direct current for comparison purposes, and yet thhe resulting direct current error signal is amplified by means of alternating current amplifiers instead of the usual direct current amplifiers. Since alternating current amplifiers are superior to direct current amplifiers from the standpoint of cost, ease of design and stability, the disadvantages of using direct current amplifiers are eliminated, and at the same time all of the advantages of using direct current for comparison purposes are retained.

It should be further noted that once the energy output of the heating element 1, 1 is adjusted to a predetermined level, which is dependent upon the ambient temperature, this level is maintained in spite of any variations in the input voltage to the regulator. This feature is apparent when it is considered that the voltage output from the reference circuit is substantially constant for a given ambient temperature, while on the other hand, the voltage output of indicator circuit would vary with variations in input voltage to the regulator A. Thus when the input voltage to regulator A is varied, an error signal is applied to the control grid 30, and the motor 53 will be operated in a direction to maintain the energy output of the lamps 1 constant for the particular given ambient temperature.

This invention also provides a "fail safe" feature which is obtained in the following manner: If an amplifier tube should fail due to loss of gain, the current in the "lower" coil L of the relay B will be decreased, thus causing the regulator A to move to its maximum voltage position. When the control system is used in chicken brooder operation, this is a highly desirable feature since if the lamp banks 1, 1 became too warm, as would happen in case of tube failure, the chicks may move out from under the lamps but remain close enough so as to still be protected. In certain other applications it might be desirable to have the regulator A adjusted to minimum position in case of tube failure. This could be accomplished merely by reversing the polarities of rectifiers 12 and 27 and by connecting the coils L and R in such a manner that they respectively cause motor operation in directions reverse from those now shown.

Although we have shown the device as used to control the voltage output of a voltage regulator in response to temperature changes, it is apparent that the device could be constructed so as to be responsive to changes in pressure, humidity or any quantity that can be expressed electrically.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What we claim as new and desire to secure by Letters Patent of the United States is:

1. A temperature responsive system for varying the energy output of a heater element in response to changes in temperature, said system comprising a source of electrical power connected to said heater element, a voltage regulator for varying the voltage across said heater element, a reference circuit including a temperature-sensitive element which is disposed so as to be substantially unaffected by the energy emitted by said heater element, said reference circuit having a direct voltage output varying as a function of said temperature, an indicating circuit having a direct voltage output which is a function of the output voltage of the voltage regulator, means for obtaining an algebraic sum of the output voltages of said reference circuit and said indicating circuit so as to produce an error signal which is a function of said sum, means for filtering said error signal to provide a substantially pure direct voltage, control means for varying the voltage output of said voltage regulator, said control means being responsive to variations in said filtered error signal to cause said voltage regulator to vary the voltage applied to the heater so as to produce the desired energy output for a given temperature.

2. A temperature responsive system for varying the energy output of a heater element in response to changes in temperature, said system comprising a source of electrical power connected to said heater element, a voltage regulator for varying the voltage across said heater element, a reference circuit including a plurality of resistances connected to form a resistance network, one of said resistances being a temperature-sensitive element which is disposed so as to be substantially unaffected by the energy emitted by said heater element, said reference circuit having a direct voltage output varying as a function of said temperature, an indicating circuit having a direct voltage output which is a function of the output voltage of the voltage regulator, means for obtaining an algebraic sum of the output voltages of said reference circuit and said indicating circuit so as to produce an error signal which is a function of said sum, alternating current amplifying means providing an alternating voltage proportional to said sum, control means for varying the voltage output of said voltage regulator, said control means being responsive to variations in said alternating voltage to cause said voltage regulator to vary the voltage applied to the heater so as to produce the desired energy output for a given temperature.

3. A temperature responsive system for varying the energy output of a heater element in response to changes in temperature, said system comprising a source of electrical power connected to said heater element, a voltage regulator for varying the voltage across said heater element, a reference circuit including a temperature sensitive element which is disposed so as to be substantially unaffected by the energy emitted by said heater element, said reference circuit having a voltage output varying as a function of said temperature, an indicating circuit having a voltage output which is a function of the output voltage of the voltage regulator, means for obtaining an algebraic sum of the output voltages of said reference circuit and said indicating circuit so as to produce an error signal which is a function of said sum, control means including a relay for varying the voltage output of said voltage regulator, said relay being responsive to variations in said error signal to cause said control means to adjust the voltage regulator so as to vary the voltage applied to the heater thereby producing the desired energy output for a given temperature.

4. A temperature responsive system for varying the energy output of a heater element in response to changes in temperature, said system comprising a source of electrical power connected to said heater element, a voltage regulator for varying the voltage across said heater element, a reference circuit including a temperature-sensitive element which is disposed so as to be substantially unaffected by the energy emitted by said heater element, said reference circuit having a voltage output varying as a function of said temperature, an indicating circuit having a voltage output which is a function of the output voltage of the voltage regulator, means for obtaining an algebraic sum of the output voltage of said reference circuit and said indicating circuit so as to produce an error signal which is a function of said sum, control means responsive to variations in said error signal for adjusting the voltage output of said regulator, said control means comprising amplifying means for amplifying said error signal, said amplifying means having a gain which is varied upon actuation of said control means so as to compensate for the inertia effect of the parts of said control means.

5. A temperature responsive system for varying the energy output of a heater element in response to changes in temperature, said system comprising a source of electrical power connected to said heater element, a voltage regulator for varying the voltage across said heater element, a reference circuit including a temperature-sensitive element which is disposed so as to be substantially unaffected by the energy emitted by said heater element, said reference circuit having a voltage output varying as a function of said temperature, an indicating circuit having a voltage output which is a function of the output voltage of the voltage regulator, means for obtaining an algebraic sum of the output voltages of said reference circuit and said indicating circuit so as to produce an error signal which is a function of said sum, control means responsive to variations in said error signal for adjusting the voltage output of said regulator, said control means comprising a motor, differential relay means controlling said motor, and amplifying means for amplifying said error signal and applying the amplified output to said differential relay means, said relay means being operated in response to variations in said amplified output so as to cause actuation of said motor in a direction to adjust the voltage regulator to the desired output voltage, said relay, upon actuation, additionally operating to vary the gain of said amplifying means so as to compensate for the inertia effect of the parts of said control means.

6. A temperature responsive system for varying the energy output of a heater element in response to changes in temperature, said system comprising a source of electrical power connected to said heater element, a voltage regulator for varying the voltage across said heater element, said regulator being adapted to provide a predetermined voltage output for a given temperature, means for obtaining an error signal which is an indication of that change in voltage output from the voltage regulator which is necessary for a given temperature, control means responsive to variations in said error signal for adjusting the voltage output of said regulator, said control means comprising amplifying means for amplifying said error signal, said amplifying means having a gain which is varied upon actuation of said control means so as to compensate for the inertia effect of the parts of said control means.

7. A temperature responsive system for varying the energy output of a heater element in response to changes in temperature, said system comprising a source of electrical power connected to said heater element, a voltage regulator for varying the voltage across said heater element, said regulator being adapted to provide a predetermined voltage output for a given temperature, means for obtaining an error signal which is an indication of that change in voltage output from the voltage regulator which is necessary for a given temperature, control means responsive to variations in said error signal for adjusting the voltage output of said regulator, said control means comprising a motor, differential relay means controlling said motor, and amplifying means for amplifying said error signal and applying the amplified output to said differential relay means, said relay means being operated in response to variations in said amplified output so as to cause actuation of said motor in a direction to adjust the voltage regulator to the desired output voltage, said relay, upon actuation, additionally operating to vary the gain of said amplifying means so as to compensate for the inertia effect of the parts of said control means.

8. A system for varying the energy output of a voltage responsive element in response to changes brought about in the resistance of an electrical resistance by changes in temperature, said system comprising a source of electrical power connected to said element, a voltage regulator for varying the voltage applied from said source to said element, a reference circuit including said electrical resistance which is sensitive to changes in temperature and is positioned so as to be substantially unaffected by the energy emitted by said element, said reference circuit having a voltage output which is a function of temperature, an indicating circuit having a voltage output which is a function of the output voltage of said volage regulator, means for obtaining an algebraic sum of the output voltages of said reference circuit and said indicating circuit so as to produce an error signal which is a function of said sum, control means for varying the voltage output of said voltage regulator, said control means being responsive to variations in said error signal to cause said voltage regulator to vary the voltage applied to the voltage responsive element so as to produce the desired energy output for a given condition of temperature.

9. A temperature responsive system for varying the energy output of a heater element in response to changes in temperature, said system comprising a source of electrical power connected to said heater element, a voltage regulator for varying the voltage across said heater element, a reference circuit including a temperature-sensitive element which is disposed so as to be substantially unaffected by the energy emitted by said heater element, said reference circuit having a unidirectional voltage output varying as a function of said temperature, an indicating circuit having a unidirectonal voltage output which is a function of the output voltage of the voltage regulator, means for obtaining an algebraic sum of the output voltages of said reference circuit and said indicating circuit so as to produce a unidirectional error signal which is a function of said sum, control means responsive to variations in said error signal for adjusting the voltage output of said regulator, said control means comprising amplifying means for amplifying said error signal, said amplifying means comprising a tube which has a control grid and a cathode, said unidirectional error signal being applied to said control grid, and a constantly varying voltage being applied to said cathode.

References Cited in the file of this patent

UNITED STATES PATENTS

| | | |
|---|---|---|
| 1,566,980 | Seede | Dec. 22, 1925 |
| 1,904,485 | Livingston | Apr. 18, 1933 |
| 2,375,988 | Gille et al. | May 15, 1945 |
| 2,556,065 | Callender | June 5, 1951 |
| 2,651,704 | Prior | Sept. 8, 1953 |